No. 858,029. PATENTED JUNE 25, 1907.
M. V. RUSH.
PNEUMATIC TIRE.
APPLICATION FILED NOV. 10, 1906.
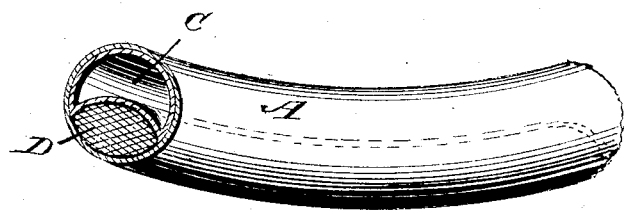
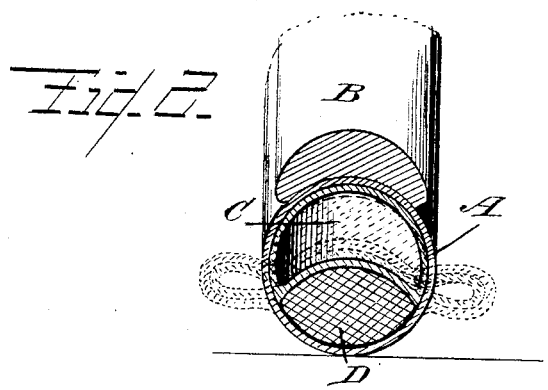
Witnesses
M. E. Moore
John E. Burch
Inventor
Martin V. Rush.
By Chas. H. Fowler
Attorney

UNITED STATES PATENT OFFICE.

MARTIN V. RUSH, OF ANDERSON, INDIANA.

PNEUMATIC TIRE.

No. 858,029.　　　Specification of Letters Patent.　　　Patented June 25, 1907.

Application filed November 10, 1906. Serial No. 342,856.

*To all whom it may concern:*

Be it known that I, MARTIN V. RUSH, a citizen of the United States, residing at Anderson, in the county of Madison and State of Indiana, have invented certain new and useful Improvements in Pneumatic Tires; and I do hereby declare that the following is a full, clear, and exact description of the same, reference being had to the annexed drawings, making a part of this specification, and to the letters and figures of reference marked thereon.

The present invention has for its object to provide a pneumatic tire that will possess strength and durability and that is capable of use on all class of cycles, automobiles, and other like vehicles, and consists in a tire constructed substantially as shown in the drawings and herein described and claimed.

Figure 1 of the drawings is a perspective view of a fragment of a tire constructed in accordance with my invention, the end of the tire being shown in section. Fig. 2 an end view on an enlarged scale showing in dotted lines the position of the tire when compressed.

In the accompanying drawings A represents the outer tube preferably composed of a suitable fabric and rubber or constructed in any manner that will admit of the necessary elasticity and flexibility of the tire, and upon the tube is the usual rim B. Within the tube A is located a concavo-convex air tube C and between the air tube and the outer tube is located a double convex core D which may be of felt or other like material that will serve the purpose as I do not wish to confine my invention to the material from which the tread core of the tire is composed.

When the tire is deflated or compressed as indicated in Fig. 2 of the drawings, the double convex core D will be forced to the center of the tire and spans the entire circumference of the tread portion thereof making a perfect acting cushion tire that will possess all the requirements necessary in a tire of this character.

The interposing of the core D between the concavo-convex tube C and the tread of the tube A and constructing the core double convex produces a tire which cannot be cut by the rim for the reason that the convex bulge will strike the hollow of the rim and the weight that is on the tire will be directed to the center of the hollow of the rim and thereby protect the tire from cutting on the edges of the rim.

The construction of the tire hereinbefore described will render the same puncture proof against tacks, nails, glass, and all sharp and rough objects that are encountered on roadways, thus providing a pneumatic tire that will possess many superior qualities over the tires in ordinary use.

Having now fully described my invention, what I claim as new and desire to secure by Letters Patent, is:—

As an improved article of manufacture, the herein described pneumatic tire, the same composed of an outer tube of elastic material, a concavo-convex air tube independent thereof and located therein and occupying more than one-half of the area thereof and having its opposite walls curved in the same direction, and a double convex core located between the air tube and the tread of the outer tube, said core upon one of its convex sides snugly fitting the concave side of the air tube, said outer tube and the air tube being laterally expansible whereby, when deflated, the double convex core will be forced to the center of the rim and constitute the entire tread portion.

In testimony whereof I affix my signature in presence of two witnesses.

MARTIN V. RUSH.

Witnesses:
　EDGAR E. HENDEE,
　J. F. STARKEY.